United States Patent [19]

Haruna et al.

[11] Patent Number: 4,713,100

[45] Date of Patent: Dec. 15, 1987

[54] ADSORPTION APPARATUS

[75] Inventors: Kazuo Haruna, Kakogawa; Iwamitsu Shiozawa, Hyogo, both of Japan

[73] Assignee: Seitetsu Kagaku Co., Ltd., Hyogo, Japan

[21] Appl. No.: 879,753

[22] Filed: Jun. 25, 1986

[51] Int. Cl.$^4$ .............................................. B01D 53/04
[52] U.S. Cl. ........................................ 55/387; 55/518
[58] Field of Search .................... 55/25, 26, 31, 33, 35, 55/58, 62, 68, 74, 75, 161–163, 179, 267, 387, 389, 516–519

[56] References Cited

U.S. PATENT DOCUMENTS

| | | | |
|---|---|---|---|
| 3,213,933 | 10/1965 | Kasparian. | |
| 3,258,899 | 7/1966 | Coffin | 55/62 X |
| 3,323,291 | 6/1967 | Kern | 55/179 X |
| 3,323,292 | 6/1967 | Brown | 55/179 X |
| 3,324,631 | 6/1967 | Kreuter | 55/179 X |
| 3,593,495 | 7/1971 | Ellison | 55/68 |
| 3,738,087 | 6/1973 | McCombs | 55/58 |
| 3,923,477 | 12/1975 | Armond et al. | 55/25 |
| 4,065,272 | 12/1977 | Armond | 55/25 |
| 4,322,228 | 3/1982 | Myers et al. | 55/179 X |
| 4,543,109 | 9/1985 | Hamlin et al. | 55/25 |

FOREIGN PATENT DOCUMENTS 852538 10/1952 Fed. Rep. of Germany.
208499 5/1940 Switzerland.
228094 6/1925 United Kingdom.

Primary Examiner—Robert Spitzer
Attorney, Agent, or Firm—Pollock, Vande Sande & Priddy

[57] ABSTRACT

An adsorption apparatus with a good heat recovery and a good noise abatement for separating a gas mixture into its components by pressure swing adsorption comprises a closed vessel having an inlet nozzle for a gas mixture at one end, an adsorbent packed as a bed in the closed vessel and a passage for an unadsorbed gas being vertically provided in the vessel through the adsorbent bed, whose one end is open above the top of the adsorbent bed and whose another end passes through the closed vessel at the inlet nozzle side to the outside.

3 Claims, 4 Drawing Figures

ADSORPTION APPARATUS

BACKGROUND OF THE INVENTION

This invention relates to an adsorption apparatus wherein a gas mixture is subjected to adsorption and subsequent separation into its components by pressure swing adsorption, which will be hereinunder referred to as PSA, and particularly to an adsorption apparatus wherein the heat of adsorption generated is effectively recovered to enhance the desorption rate from the adsorbent packed therein and also the noise caused by a gas flow in PSA operation is considerably abated by the adsorbent bed.

In the conventional PSA adsorption technique for producing an oxygen-enriched gas from an oxygen-containing gas, for example, air, using a bed of zeolite molecular sieve packed as an adsorbent in an adsorption apparatus (U.S. Pat. Nos. 3,923,479, and 3,738,087), the air is subjected to selective adsorption of nitrogen on the bed of zeolite molecular sieve by trapping the nitrogen in the pores of the molecular sieve, while the heat of adsorption of about 0.2 Kcal per 1 Nl of the adsorbed gas is generated. The unadsorbed gas, that is, oxygen-enriched gas, moves through the bed toward the outlet of the apparatus, while being heated by the generated heat of adsorption, that is, the unadsorbed gas has an elevated temperature by the heating with the generated heat of adsorption and carries away the heat to the outside of the adsorption apparatus.

On the other hand, when the adsorbed nitrogen is desorbed by reducing the pressure to the lower level than that of adsorption, an endothermic phenomenon takes place, and the temperature of the adsorbent bed is lowered by adiabatic cooling. That is, the adsorbent bed portion near the inlet of the adsorption apparatus is inevitably cooled down to a lower temperature. If the adsorbent bed is cooled down to a temperature too low, the moisture and $CO_2$ in the desorbing gas which have a strong affinity toward the adsorbent are firmly trapped in the adsorbent, reducing the separation efficiency between the nitrogen and the oxygen.

When the adsorption and desorption are carried out repeatedly, the adsorbent bed will finally have such a temperature distribution as given by curve "Conventional" in FIG. 1 with a considerable temperature difference between the inlet side and the outlet side of the adsorbent bed.

Moreover, in the conventional PSA technique, a large amount of the unadsorbed gas, for example, oxygen-enriched gas, leaving the adsorption apparatus is passed through an outside piping with a considerably smaller cross-sectional area than that of the adsorption apparatus, and thus the flow rate of the unadsorbed gas passing through the piping becomes so high while the gas pressure is widely and frequently changed during the adsorption and desorption steps in the PSA operation that a high level noise occurs outside the adsorption apparatus.

SUMMARY OF THE INVENTION

An object of the present invention is to provide an improved adsorption apparatus for separating a gas mixture into its components by pressure swing adsorption (PSA) with a good effect on heat recovery and sound insulation.

According to the present invention, there is provided an adsorption apparatus for separating a gas mixture into its components by pressure swing adsorption. The apparatus comprises a closed vessel having an inlet nozzle for a gas mixture at one end, an adsorbent packed as a bed in the closed vessel, and a passage for an unadsorbed gas being vertically provided in the vessel through the adsorbent bed, whose one end is open above the top of the adsorbent bed and whose another end passes through the closed vessel at the inlet nozzle side to the outside. The passage comprises a main standing pipe whose one end is open at the outside of the vessel and whose another end is connected to a plurality of branched pipes having openings above the top of the adsorbent bed and being provided through the adsorbent bed, and the closed vessel is in a cylindrical column form.

PREFERRED EMBODIMENTS OF THE INVENTION

The present invention provides an adsorption apparatus wherein an adsorbent such as a zeolite molecular sieve, a carbon molecular sieve or the like is packed in a bed and an oxygen-containing gas mixture is subjected to selective adsorption and subsequent separation into its components by PSA. The inlet bed portion of the adsorption apparatus is heated by an outgoing gas of a higher temperature than that of the incoming gas and receives a heat energy necessary for desorption, whereby the desorption rate from the adsorbent is enhanced and the noise caused by a gas flow through an outgoing gas pipe in the adsorbent bed due to a high velocity is abated by the effect of noise adsorption of the adsorbent bed. The adsorption apparatus of the present invention can be applied more advantageously to a gas mixture composed substantially of oxygen and nitrogen, because the temperature differences in the adsorbent bed is quite pronounced for oxygen and nitrogen.

Figure 1:
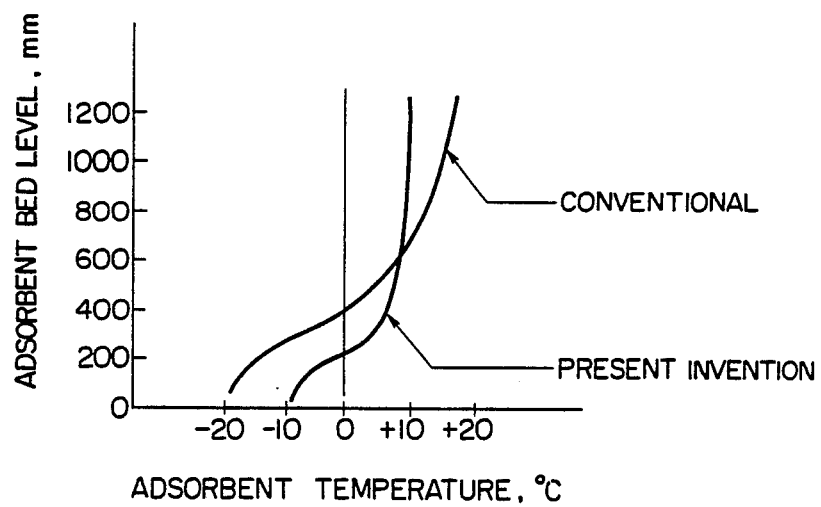
FIG. 1 shows temperature distribution curves in an adsorbent bed in its vertical direction, wherein the differences of the temperature distribution are shown for both a conventional apparatus and the present invention apparatus.
Figure 2:
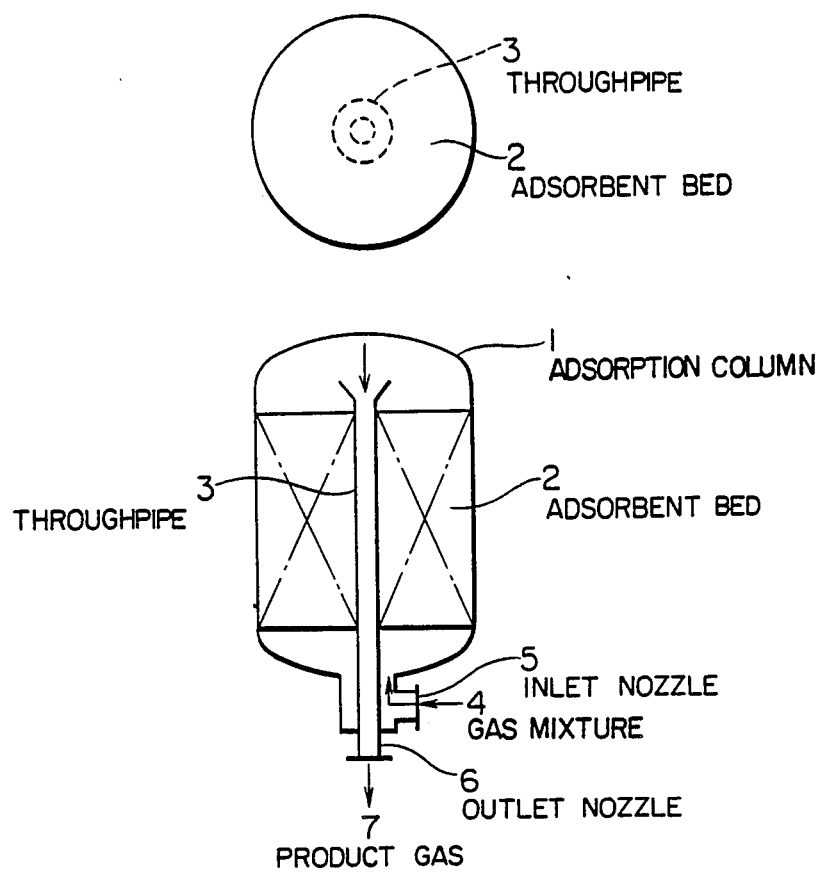
FIG. 2 is a schematic drawing showing a state in which an outgoing gas pipe passes through an adsorbent packed in an adsorption apparatus.
Figure 3:
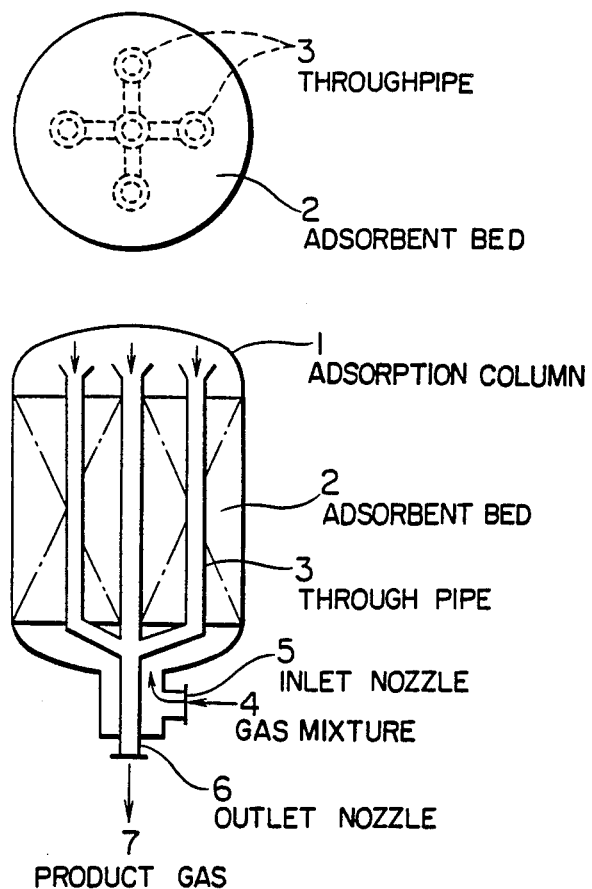
FIG. 3 is a schematic drawing showing a state in which 5 branched outgoing gas pipes pass through an adsorbent packed in an adsorption apparatus.

When the present invention is applied to the adsorption column as shown in FIGS. 2 or 3, the temperature difference between top and bottom of the adsorbent bed in its vertical direction becomes smaller, as shown in FIG. 1 and as the result, separation efficiency of the adsorption apparatus can be prevented from a decrease.

The structure of the adsorption apparatus according to the present invention will be described in detail below, referring to the drawings.

In FIG. 2, the structure of a cylindrical vertical adsorption column 1 according to the present invention is shown, where one throughpipe 3 as an outgoing gas passage passes through an adsorbent packed in the adsorption column 1.

In FIG. 3, the structure of another cylindrical vertical adsorption column 1 is shown, where 5 branched throughpipes 3 as outgoing passages are provided through the adsorbent bed 2 and joined into one main pipe at the bottom of the adsorbent bed.

In FIGS. 2 and 3, a gas mixture 4, for example, air, is introduced into the adsorption column 1 through an inlet nozzle 5 at the bottom of the adsorption column 1, and moves upwardly through the adsorbent bed 2, while a gas component, for example, nitrogen is preferentially adsorbed by the adsorbent bed 2, releasing the heat of adsorption.

The unadsorbed gas leaving the adsorbent bed 2, for example, oxygen-enriched gas, is heated by the heat of adsorption, that is, possesses the heat of adsorption, and flows back through the throughpipe 3 provided through the adsorbent bed 2, while the sensible heat possessed by the unadsorbed gas is recovered by the adsorbent bed 2 by the effect of heat exchange therebetween, and is discharged from an outlet nozzle 6 as a product gas 7.

Since the throughpipe 3 as an outgoing passage is surrounded by the adsorbent the noise caused by gas flow through the throughpipe in PSA operation is absorbed by the absorbent bed. In the present invention, the adsorbent bed serves as an acoustic barrier, and no special acoustic barrier is required.

The effect of the heat recovery by the adsorbent bed is increased with increasing number of branched pipes through the adsorbent bed, as shown in FIG. 3.

Figure 4:
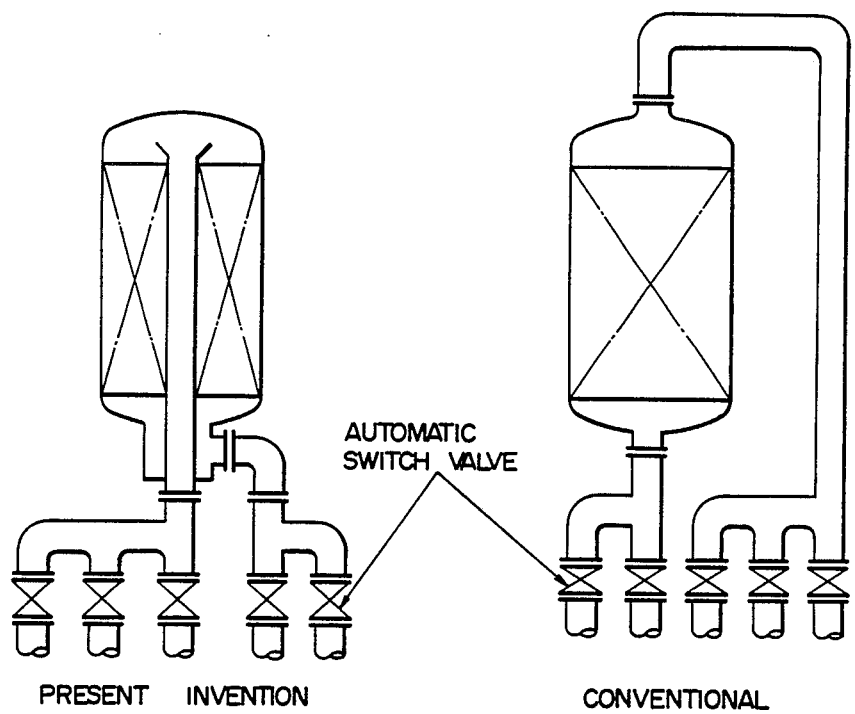
FIG. 4 schematically shows the arrangements of the present invention apparatus and a conventional apparatus each with an incoming gas pipe and an outgoing gas pipe, provided with automatic switch valves.

In FIG. 4, the arrangements of a conventional adsorption apparatus and the present invention adsorption apparatus are schematically shown together with an incoming gas piping and an outgoing gas piping each provided with automatic switch valves.

According to the arrangement of the conventional adsorption apparatus, the outgoing gas piping is provided at the outside of the apparatus from the top to the bottom of the apparatus as shown in FIG. 4, the noise caused by the outgoing gas flow through the piping is directly emitted to the surroundings, causing a noise pollution, and also the heat of adsorption possessed by the outgoing gas is radiated as such to the surroundings without any recovery within the adsorption column.

The present invention will be described in detail below, referring to the Examples.

EXAMPLE 1

In an adsorption apparatus composed of three adsorption columns arranged in parallel, each 3.2 m in diameter and 3.5 m high, packed with zeolite molecular sieve type 5A (made by Bayer AG, West Germany), producing 766 Nm$^3$/hr of 93 vol. % oxygen-enriched gas from air by PSA, noise was measured at a position 1.5 m distant from the conventional adsorption columns and the present adsorption column with the outgoing gas piping (pipe size: 250 A) in the arrangement as shown in FIG. 4. The conventional adsorption apparatus had a noise level of 98 dB (A), whereas the present adsorption apparatus had 79 dB (A).

EXAMPLE 2

In the adsorption apparatus of Example 1, the inside temperature of one of the adsorption columns was measured at a point 1.5 m distant from the shell in the radial direction by a resistance thermometer for the conventional adsorption column and the present adsorption column as shown in FIG. 4. The results as shown in FIG. 1 were obtained.

The bottom portion of the adsorbent bed is heated by the outgoing product gas passing through a throughpipe provided through the adsorbent bed in an adsorption apparatus, whereby the heat necessary for desorption can be provided, the temperature distribution of the adsorbent bed is made uniform and the desorption rate is increased in the present invention. At the same time, the adsorbent bed works as an acoustic barrier to absorb the noise caused by the outgoing product gas through the throughpipe, and any sound insulation is not required.

Furthermore, the larger the scale of adsorption apparatus of the present invention, the larger the effect of heat recovery, because the bed temperature of the large scale adsorption apparatus is hardly influenced by the ambient temperature.

What is claimed is:

1. An industrial scale adsorption apparatus for separating a gas mixture into its components by pressure swing adsorption, comprising:

a closed vessel, having an inlet nozzle at one end for admitting said gas mixture;

an adsorbent bed retained inside said vessel; and, a plurality of unrestricted passages extending vertically in said vessel through entire height of said adsorbent bed, each of said passages being open at one end above said bed for admitting an unadsorbed gas, all said passages discharging inside said closed vessel, into one common outgoing passage being in communication with an outlet nozzle.

2. An industrial scale adsorption apparatus for separating a gas mixture into its components by pressure swing adsorption, comprising:

a closed vessel, having an inlet nozzle at one end for admitting said gas mixture;

an adsorbent bed retained inside said vessel; and, a main pipe and plurality of branched pipes, all pipes extending vertically in said vessel through said adsorbent bed, all said pipes being open at one end above said bed for admitting an unadsorbed gas, each of said branched pipes discharging into said main pipe at another end, said main pipe having an other end open at the outside of said vessel, and wherein said adsorbent bed constitutes a sound isolation for a high velocity flow of said unadsorbed gas.

3. An adsorption apparatus according to claim 1 or 2, wherein said closed vessel is in a cylindrical column form.

* * * * *